J. R. McCLINTOCK.
Cotton-Bale Ties.
No. 5,919. Reissued June 16, 1874.
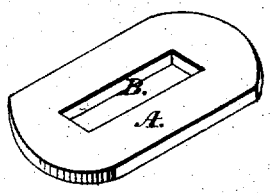
Witnesses,
Edwin James
K. V. Gordon
Inventor,
James R. McClintock
per J. E. P. Holmead
Attorney.
AM. PHOTO-LITHOGRAPHIC Co. N. Y. (OSBORNE'S PROCESS.)

UNITED STATES PATENT OFFICE.

JAMES R. McCLINTOCK, OF MOBILE, ALABAMA, FOR HIMSELF, AND AS THE LEGAL REPRESENTATIVE OF JOHN CUMBERLAND, DECEASED, ASSIGNOR, BY MESNE ASSIGNMENTS, TO ANDREW J. AIKEN, OF NEW ORLEANS, LA., AND GEORGE N. BEARD AND ELEAZAR J. BEARD, (COMPOSING THE FIRM OF BEARD & BRO.,) OF ST. LOUIS, MO.

IMPROVEMENT IN COTTON-BALE TIES.

Specification forming part of Letters Patent No. 115,225, dated May 23, 1871; reissue No. 5,404, dated May 13, 1873; re'ssue No. 5,919, dated June 16, 1874; application filed June 12, 1874.

*To all whom it may concern:*

Be it known that Letters Patent of the United States, No. 115,225, for Improvements in Cotton-Bale Ties, were issued to JAMES R. McCLINTOCK, for himself, and as the legal representative of JOHN CUMBERLAND, deceased, on May 23, 1871; that ANDREW J. AIKEN, of New Orleans, in the parish of Orleans and State of Louisiana, and GEORGE N. BEARD and ELEAZAR J. BEARD, composing the firm of BEARD & BRO., of the city and county of St. Louis and State of Missouri, are now the sole owners, by mesne assignments, of said Letters Patent; and that the following is a full, clear, and exact description of the same, reference being had to the accompanying drawing and the letters of reference marked thereon, making part of this specification, in which is represented a plan view of the bale-tie.

Before I proceed to indicate the nature of this invention, or describe its mechanical construction and distinctive characteristics, it is proper to state that, in substituting metallic bands for ropes on bales of cotton, the greatest difficulty to be overcome is the making a secure tie or connection of the ends of the bands after they are put around the bale. It was thought at first that to effect this object it would be sufficient to cut the ends of the bands in such a manner that they would interlock the one end into the other, and hence a variety of modes of cutting and forming the two ends of such bands so as to adjust and lock them together have been devised and tried; but in every instance it has been found that the bands were so weakened by the cutting that they could not withstand the strain to which they were subjected by the energy of the expansive force resulting from the elastic properties of the cotton within the bale, especially if by accident the bale received any sudden shock or concussion. Thus it fell out that Cleveland's method of fastening the ends of metallic bands together, for which he applied for a patent in 1846, and those of others who followed after him with different arrangements, acting on the same principle, were demonstrated to be useless for all practical purposes; and it consequently became apparent that it would be necessary to employ a supplemental part in the nature of a buckle to secure a tie of the two ends together; and that this buckle should be of such construction as not to require any cutting of the bands; and that it should be susceptible of being so applied in practice as to bring into use the powerful agency of the expansive pressure from the cotton within the bale as a co-operative means to secure firmly the tie or lock of the ends together, which the supplemental device in part established.

The invention of JAMES R. McCLINTOCK and JOHN CUMBERLAND, deceased, of whom McCLINTOCK was the legal representative, is a device of this kind, and its nature is of the simplest possible description, for it consists of a buckle of wrought-iron that is stamped or cut from plates of proper thickness by a single operation of a suitable tool or die, and which is provided with a central opening or slot to receive the two ends of a band, and secure them by the aid of the expansive force of the cotton within the bale; but the invention will be better understood by referring to the drawing, on which it is delineated in what is deemed the simplest and best form in which it can be made.

As delineated it has an oblong external configuration with rounded ends, and an oblong central slot just wide enough to permit of the easy introduction of the two ends of a band. The rounded ends of the buckle, presenting a more symmetrical and handsome formation than any other, while at the same time they are less liable to catch against other objects in the handling of the bale or the transportation of it from place to place, are deemed preferable to any others; but obviously the buckle might be made oblong or square, and with uncut corners, or of any other convenient external formation, without at all affecting its mode of operation. So, also, the central opening, marked B on the drawing, might be proportionately somewhat wider than as shown on the drawing without at all interfering with its capacity to fulfill the object designed to be subserved by it; but the sides of the aperture of the buckle with which the band is connected should be parallel to each other throughout, as shown on the drawing.

In applying the device to use, a variety of modes of attaching the ends of the bands to it may be adopted, the mode which I prefer being to bend the ends of the band downward, one of them being bent around the inner edge of the buckle into the form of an oblate hook, so that, when the bale is withdrawn from the compressing-machine, the expansive force of the compressed cotton will push said end against the under side of the band, and thus effectually secure the fastening.

What I claim as new, and desire to secure by Letters Patent of the United States, is—

The buckle A, provided with a central opening or slot, B, when the same is used for fastening the ends of metallic bands together around cotton-bales, in the manner substantially as herein described.

In testimony whereof I have signed my name to this specification before two subscribing witnesses.

JAMES R. McCLINTOCK.

Witnesses:
EDWIN JAMES,
JOS. T. K. PLANT.